(12) United States Patent
St. Julien et al.

(10) Patent No.: US 6,299,958 B1
(45) Date of Patent: Oct. 9, 2001

(54) MANUFACTURE OF CELLULAR HONEYCOMB STRUCTURES

(75) Inventors: Dell J. St. Julien, Watkins Glen; John F. Wight, Jr., Painted Post; Shy-Hsien Wu, Horseheads; Kenneth E. Zaun, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/211,379

(22) Filed: Dec. 14, 1998

Related U.S. Application Data

(60) Provisional application No. 60/068,230, filed on Dec. 19, 1997.

(51) Int. Cl.[7] .................................................. B32B 3/12
(52) U.S. Cl. .......................... 428/73; 428/116; 52/793.1; 264/630; 156/197
(58) Field of Search .................................. 428/116, 117, 428/73; 156/197; 52/793.1; 264/629, 630

(56) References Cited

U.S. PATENT DOCUMENTS

| | | |
|---|---|---|
| 3,320,044 | 5/1967 | Cole et al. . |
| 3,872,564 | 3/1975 | Myers et al. . |
| 3,887,739 | 6/1975 | Kromrey . |
| 4,448,833 | 5/1984 | Yamaguchi et al. . |
| 4,556,543 | 12/1985 | Mochida et al. . |
| 5,316,710 | 5/1994 | Tasaki et al. . |
| 5,393,587 | 2/1995 | Machida et al. . |
| 5,633,066 | 5/1997 | Lipp et al. . |
| 5,774,779 | 6/1998 | Tuchinskiy . |
| 5,979,507 | 11/1999 | Kojima et al. . |

FOREIGN PATENT DOCUMENTS

| | | |
|---|---|---|
| 53-26857 | 3/1978 | (JP) . |
| 9-206526 | * 8/1997 | (JP) . |

OTHER PUBLICATIONS

"Microfabrication of Ceramics by Co–extrusion", Van Hoy et al., *J.Am.Ceram. Soc.*, 81[1] 152–158 (1998).

"The Mechanics of Extrusion", H. R. Hodkinson, Claycraft, Nov., 1962, p. 42–48.

* cited by examiner

*Primary Examiner*—Deborah Jones
*Assistant Examiner*—Wendy Boss
(74) *Attorney, Agent, or Firm*—Kees van der Sterre

(57) ABSTRACT

A powder-formed cellular honeycomb body of novel tapered, curved and/or very high cell density configuration is provided through a reforming procedure wherein a precursor honeycomb shaped from a plasticized powder batch material is filled with a compatible plastic filler, reshaped at a temperature at which the plastic deformation characteristics of the honeycomb and filler are matched, and then solidified after removal of the filler to fix the final configuration of the body.

23 Claims, 3 Drawing Sheets

MANUFACTURE OF CELLULAR HONEYCOMB STRUCTURES

This application claims the benefit of U.S. Provisional Application No. 60/068,230, filed Dec. 19, 1997, abandoned, entitled MANUFACTURE OF CELLULAR HONEYCOMB STRUCTURES, by Dell J. St. Julien, John F. Wight, Jr., Shy-Hsien Wu, and Kenneth E. Zaun.

BACKGROUND OF THE INVENTION

The present invention relates to the manufacture of novel honeycomb structures from plasticized batches of inorganic or organic powders.

Ceramic and metallic honeycomb structures are widely used for applications such as catalyst substrates, honeycomb heaters, and the like, and the fabrication of such structures from plasticized batches of inorganic powders is well known. U.S. Pat. No. 3,320,044 to Cole describes a method of constructing ceramic honeycombs from sheets or ribbons of plasticized ceramic material, while U.S. Pat. Nos. 3,790,654 and 3,905,743 to Bagley describe direct extrusion methods and apparatus for such manufacture.

The more widely used extrusion methods for forming honeycomb structures commonly involve compounding a batch comprising inorganic powders together with added plasticizer, vehicle and binder components to achieve a plastic consistency. The plasticized batch is thereafter forced through an extrusion die to form a honeycomb shape which is then solidified by drying, heat-curing, reaction sintering or similar processing.

Dies for honeycomb extrusion typically comprise a die body incorporating a plurality of feedholes on an inlet face which extend through the body to convey the plasticized batch material to a discharge section on an opposing die outlet face. The discharge section incorporates a criss-crossing array of discharge slots, cut into the outlet face to connect with the feedholes within the die body, these slots reforming the batch material supplied by the feedholes into the interconnecting cell wall structure of the desired cellular honeycomb structure.

As the uses for such honeycomb structures have increased, so also has the need for providing more finely structured honeycombs. A fundamental limitation of the extrusion approach, however, is the fact that neither the feedholes nor the discharge slots in conventional extrusion dies may be multiplied without limit. Real limits on the cell density (the number of cells per unit honeycomb cross-section) and cell wall thicknesses obtainable by extrusion through honeycomb extrusion dies are imposed by available die machining methods. Also limiting are the finite strength and stiffness of available die fabrication materials. Die extrusion pressure increases with increasing cell density due to higher shear rates from thinner slits and due to increased die friction drag area. Thus it remains difficult to provide ceramic honeycombs of very fine dimensions for various specialty applications where conventional honeycomb dimensions are too large.

Also of interest for a variety of fluid processing applications are honeycombs offering channels of other than straight cylindrical or polygonal cross-sectional shape. U.S. Pat. Nos. 5,393,587 and 5,633,066, for example, disclose honeycomb designs offering curved or twisting flow paths through a channeled structure, for purposes such as controlling flow rates, enhancing fluid-wall contact, and the like. However, the cell and cell wall dimensions of these honeycombs remain relatively large, and maintaining precise control over the size, shape and direction of the channels forming the flowpaths is difficult.

It is therefore one object of the present invention to provide novel processes for the manufacture of cellular honeycomb structures from plasticized powder batch materials that can offer products of much finer cell structure and thinner cell walls than can be produced through the direct extrusion of honeycombs from conventional plasticized powder batch materials.

It is another object of the invention to provide novel designs for honeycomb structures, and methods for making them, including curved, conical, or other functionally graded honeycomb shapes offering new capabilities for the controlled conveyance and/or treatment of fluid streams arising within catalytic treatment or other chemical processing environments.

Other objects and advantages of the invention will become apparent from the following description thereof.

SUMMARY OF THE INVENTION

The present invention provides a novel honeycomb forming process comprising the re-shaping, by molding, extrusion, drawing, or the like, of honeycomb structures produced by other, more conventional methods. The forming process of the invention utilizes the controlled rheology and incompressibility of selected plastic filler materials to produce new and previously unattainable cell and cell wall configurations in the final honeycomb products.

Inventive products which may be produced by honeycomb reforming in accordance with the invention include cellular honeycomb structures of very high cell density and very low wall thickness. Also provided are honeycombs with functionally graded (e.g., curved, twisted, or tapering) cell shapes, these being available in both conventional and high-cell-density forms.

In a first aspect, then, the invention includes a method of producing a cellular structure by a reforming procedure. That method comprises first selecting a honeycomb body formed of a plasticized powder batch material. The honeycomb will have a cellular structure which includes a plurality of axial channels having predetermined cross-sections.

The parallel channels of the honeycomb are next filled with a selected filler of appropriate plasticity to form a filled composite. Generally, the plasticity required of the filler material is a plastic deformation behavior compatible with that of the plasticized powder batch material forming the honeycomb. Compatibility must be exhibited in at least one temperature range within which the honeycomb can be reshaped.

The filled composite thus provided is then reshaped to modify the channel size, shape, and/or direction within the honeycomb. Reshaping can be accomplished by methods such as drawing, extruding, compressing, bending, or twisting of the filled honeycomb, and will be carried out at a temperature in the range where the viscoplastic properties of the honeycomb and filler are compatible. The preferred reshaping methods are those which will reduce the cross-sections of a plurality of the channels in at least one cross-sectional dimension, thus providing a cell structure which is finer in both cell size and cell wall thickness in that dimension than the starting honeycomb.

Particularly useful reformed shapes include frustum shapes wherein the honeycomb has been reformed to impart a taper from a relatively large part cross-section to a relatively small part cross-section. In accordance with the invention, a proportional tapering of all honeycomb design elements, including channel size, channel shape, and channel wall cross-section, is secured in the reshaped part. Thus both channel size and channel wall thickness decrease along the axis of the frustum in near proportion to the reduction in part dimensions.

Other useful reformed shapes include honeycomb structures of extremely high cell density and slight channel wall thicknesses. Cell densities of 1600 cells/in$^2$ and greater, preferably at least 2000 cells/in$^2$, with cell wall thicknesses below 0.004 inches, are readily attained through this procedure.

After reshaping has been completed, the plastic filler is removed from the reconfigured channels and the reformed honeycomb body is solidified. Typically, solidification involves drying and/or firing to sinter or reaction-sinter the particles present in the original powder batch into an integral honeycomb structure.

DESCRIPTION OF THE DRAWING

The invention may be further understood by reference to the drawing, wherein.

DETAILED DESCRIPTION

Figure 1:
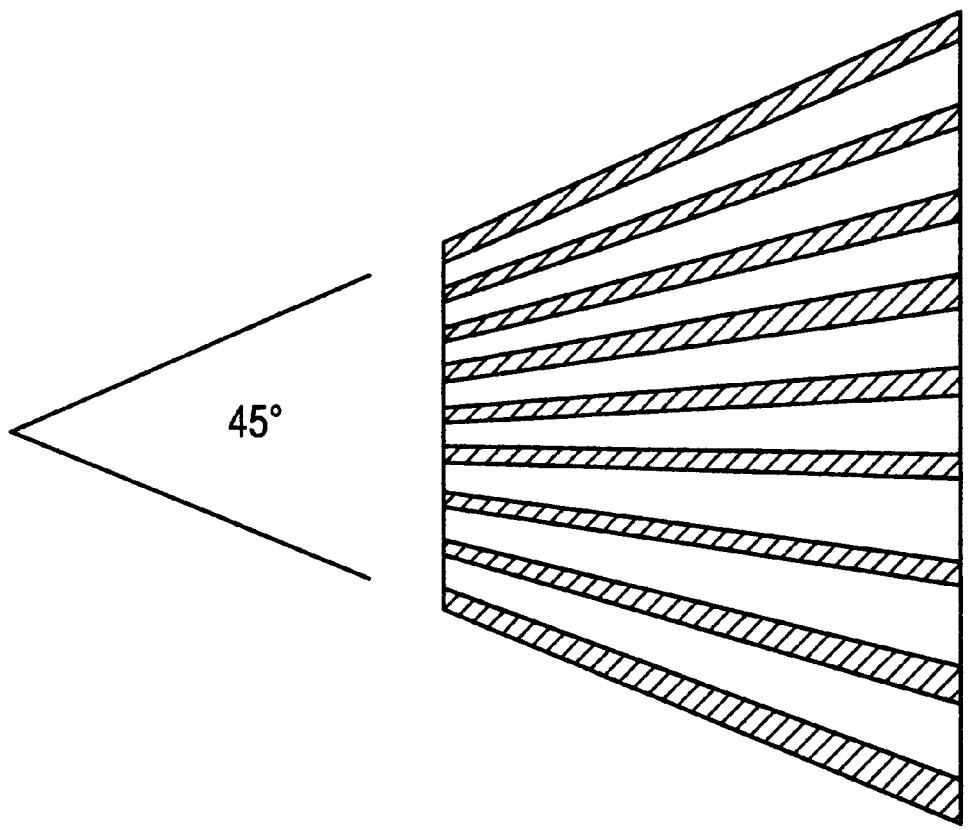
FIG. 1 is a schematic cross-sectional elevational view of a section of a tapered honeycomb element provided in accordance with the invention.

The composition of the inorganic powders used to formulate the plasticized batch for shaping the selected honeycomb element is not critical. The powders may be metallic, semi-metallic, ceramic, polymer or even precursor organic, e.g., composed of precursors to carbon or other active or relatively inert inorganic materials, as well as appropriately selected mixtures thereof. The powders may be employed either in raw (mineral) or in refined form.

Specific examples of powder types include powdered glasses or powdered crystalline or semi-crystalline ceramic materials, particularly including amorphous silicate, borate or aluminate glasses and/or crystalline oxides (e.g. silicates, aluminates, borates), carbides, borides, and aluminides. Particular powder materials may include mineral powders such as cordierite, spinel, various clays, and talc, refined powders of alumina, silica, and the oxides of calcium, magnesium, boron, titanium, germanium, and the alkali and transition metals, and various mixtures or chemical combinations thereof.

The plasticizing vehicle/binder system used to compound the plasticized powder batch will depend in part on the composition and morphology of the solid powder components of the batch. Aqueous binder systems comprising a water vehicle and a plasticizing additive such as a cellulosic binder, e.g., a methyl hydroxypropyl cellulose, can provide highly plastic batches, particularly if the powders include substantial proportions of kaolinitic clays. Batches of this type, disclosed for example in U.S. Pat. No. 3,885,997, are presently in large-scale commercial use for the production of cordierite honeycombs.

Other components which may be present in these types of binder systems, both for metallic and for ceramic powders, include dispersants, surfactants, lubricants, polymers and/or additional water-miscible and/or water-immiscible organic vehicles. Specific types of compounds which may been included in these batches include the alkali stearates, oleic acid and its derivatives, and co-binders such as the polyvinyl alcohols and silicones.

Non-aqueous binder systems that secure a degree of plasticity to an extruded honeycomb shape can also be used. These may include polymer-solvent or wax-based binder systems, the latter comprising mixtures of waxes, wax-polymer blends, and solutions of waxes in various organic solvents. U.S. Pat. No. 5,602,197, for example, discloses extrudable ceramic and/or metal powder batches with particularly good post-forming plasticity, based on a gelling binder system comprising an elastomeric polymer component dissolved in a low-melting wax vehicle.

Batches formed from the selected inorganic powders and aqueous or non-aqueous binder systems may be compounded and conditioned for extrusion using known mixing and plasticizing methods and equipment, and may be formed into honeycomb preforms by conventional forming procedures such as molding or, more preferably, extrusion. Continuous extrusion procedures and apparatus, such as disclosed, for example, in U.S. Pat. Nos. 3,790,654 and 4,551,295, are particularly well suited to the production of precisely engineered honeycomb preforms at relatively low cost.

Filling of the parallel channels of the honeycomb structure with an appropriate plastic filler should be accomplished in a manner which will protect the cellular structure from inadvertent damage to or alteration of the initial honeycomb channel size and shape during the filling process. In the case of honeycomb compositions which are to be back-filled in their as-extruded plastic condition, the filler will typically be introduced into the honeycomb channel structure in liquid or dispersed form. The liquid filler is then partly or completely solidified to convert it to a plastic state suitable for reshaping of the back-filled honeycomb. Solidification may result, e.g., from crystallization or gelling. In the case of gelling, the gelling process may be initiated by means of an added gelling agent, combined with the filler before back-filling or introduced therein from the channel walls of the honeycomb.

Where the initial honeycomb shape is to be converted to a solid shape prior to back-filling, as by drying, gelling or freezing, conversion of the filler to liquid form will not be necessary. In the latter case fillers having a semi-solid or paste consistency at filling temperatures can be used.

It is also possible to return a "dry-green" honeycomb body earlier solidified by drying (but not sintering) to a plastic condition, by re-introducing a liquid into the structure. Where the dry-green body is originally plasticized with a water solution of a reversible-thermogellable binder such as a cellulose ether and thereafter dried, reconstitution may comprise saturating the body with water at a temperature above the gel point of the binder. The water should be removed prior to reducing the temperature of the body to the gel point. For example, in the case of a honeycomb structure comprising mineral powders bound together with a methyl cellulose binder additive, exposure to near-boiling water can develop the necessary plasticity without undesirable swelling of the binder.

One suitable test for evaluating the physical suitability of a candidate filler material is the blunt indenter test. In this test a 2 mm diameter stick is pushed perpendicularly into a candidate filler material at a pre-determined reforming temperature and the filler deformation mechanism is noted. An elastic response (e.g. a Jello-like recovery) is undesirable. A brittle response (e.g. radiating fracture lines and haze) is undesirable. A plastic response (e.g. a plastic heaving up of the material about the indenter) is desirable.

The chemical composition of the filler will be selected with due regard for the composition of the honeycomb, most importantly the composition of the honeycomb binder system employed. The filler should have little or no solubility in or miscibility with the binder components of the honeycomb, nor should it exhibit substantial osmotic affinity or solvating activity for any components of the binder system. In general, these conditions will be favored if hydrophobic fillers (e.g. wax-based) are used with aqueous binder systems (e.g. methylcellulose-based binders), and hydrophilic fillers (e.g. starch or polyethylene glycol based fillers used with water immiscible organic binders (e.g. elastomer-based binders). Optimum filler compositions for any particular binder system can of course be readily determined through routine experiment, using a suitable binder/filler contact interval to identify interactions deleterious to the requisite properties of either.

Examples of families of fillers useful in combination with aqueous binder systems include heat softenable vegetable or animal fats, natural or synthesized fatty acids, polyalcohols and/or esters, paraffins (often blended with other components for improved flexibility and plasticity), other hydrocarbon waxes, both natural and synthetic, and synthesized thermoplastic polymeric materials. Particular examples of fillers of these types range from butter to microcrystalline wax to crystalline waxes in combination with modifiers such as propylene glycol monostearate and mineral oil.

Specific filler materials of wax type which are expected to offer good performance when used with aqueous honeycomb binder systems containing methylcellulose and/or hydroxypropyl methylcellulose as the principal plasticizing constituent are reported in Table I below. Included in the Table for selected ones of the fillers are the melting points of the materials (as determined by ASTM D-127), needle penetration at 25° C. (ASTM D-1321), viscosity at 99° C. (in Saybolt Universal Seconds per ASTM D-445) and density at ambient (25° C.) and near-boiling (99° C.) temperatures. As typical of many commercial wax formulations, certain of the physical and thermal properties of the waxes are reported as ranges. These values are not controlled to discrete values by wax manufacturers, since the properties of the products may vary within relatively wide limits without adversely impacting utility for most commercial applications. In general the materials reported in Table I, which may all be characterized as microcrystalline waxes, are ranked in general order from relatively hard and flexible to relatively soft and sticky in character.

TABLE I

| Filler Material | Fillers | | | |
|---|---|---|---|---|
| | Melting point [° C.] | Needle Penetration @ 25° C. | Viscosity @ 99° C. (SUS) | Density 25° C./99° C. |
| Bareco Victory wax | 74/79 | 20/35 | 70/90 | 0.93/0.79 |
| Bareco Ultraflex wax | 63.9/74.4 | 21/39 | 76/94 | 0.92/0.79 |
| Witco W-445 wax | 77/82 | 25/35 | 75/90 | |
| Witco W-835 wax | 74/79 | 60/80 | 75/90 | |
| Blended wax BW-568 | 74 | 65 | | |

As previously indicated, the relative plasticities of the various filler and powder/binder mixtures used in the practice of the invention are typically temperature dependent. That is, each of the components of the filled honeycomb will have plastic characteristics which depend at least to some degree on the temperature of its constituent materials. This does not present a problem provided there is a least some temperature range over which the deformation characteristics of the filler are sufficiently compatible with those of the honeycomb so that the filler will plastically and hydrostatically support the cellular honeycomb structure from buckling and/or fracturing during the process of plastic reshaping.

By compatible deformation characteristics is meant that the honeycomb web and the filler deform as if as one at the reforming temperature. If the filler is marginally soft, web elongation during reduction in a fracture manner rather than in a plastic manner can result. When web elongation is accompanied by fracturing sufficient to introduce voids or openings in the webs, the web and filler materials do not have compatible deformation characteristics.

Reductions or other deformations of filled honeycombs in accordance with the invention may be confined (as by extrusion) or unconfined (as by drawing). Unconfined reduction or deformation refers to the case where the volume of the material being reformed may increase during the process; this can occur locally and coarsely when the material fractures on bending or stretching.

When easy fracture on bending occurs, the extrudate is referred to as being "short". A "short" extrudate coarsely and locally fractures rather than finely and uniformly fractures (unsaturates) or plastically (constant volume) deforms under unconfined deformation. An extrudable "short" material may be plastic under confined deformation, but may be brittle under unconfined deformation.

In cases where the honeycomb web material is quite short and/or the filler is too soft, the filler penetrates and/or opens fissures in the web. This permits web volume to more easily increase, i.e., causes the web deformation to not be under constant volume (confined) conditions. Particularly for many ceramic-powder-filled pastes, the web is only plastic under constant volume (confined) deformation, and even in that case an overly-soft fill promotes fissuring and checking of the web. This is most clearly observed with some of the softer waxes. With extreme softness the filler tends to be expelled from the honeycomb channels during reshaping, causing complete or partial collapse of some or all of the channels.

Conversely, if the filler is too hard and brittle, then gross fractures/slips will form as indicated by domains of unequal cell reduction and cell mis-registration throughout the tapered and reduced extrudate. This can be observed with some of the harder fillers such as propylene glycol monostearate. Again, the optimum reshaping temperature for any filler/binder system can readily be determined by routine experiment.

Any of the various drawing, twisting, or bending methods noted above can be used to reshape the filled honeycomb into a desired configuration. However, and particularly for relatively "short" materials such as methyl cellulose-plasticized clay-based batches of the kind used for commercial cordierite honeycomb production, the preferred mode of deformation is compressive (e.g. molding) rather than tensile (e.g. drawing). As noted above, compressive or confined deformation methods tend to keep the volume of the material constant during deformation so as to not introduce a compressible phase: an open crack or void.

Molding by extrusion is a particularly convenient method for impressing a taper on a filled honeycomb structure, and can be carried out by forcing the filled honeycomb from a suitable supporting enclosure (i.e. the barrel of the ram extruder) into or through a tapered barrel, mold or extrusion die of a desired prismatic, conical, or other tapering form. The extrusion path will have an inlet cross-section close in size and shape to that of the supporting enclosure for the starting honeycomb, and will offer a smooth transition to an outlet or receptacle having a different cross-sectional size and/or shape, corresponding to a predetermined channel size and shape for the final honeycomb product.

Any size reduction carried out between the die inlet and outlet will dictate a corresponding increase in cell density and overall reduction in cell wall thickness in the reshaped product, while any change in outlet shape will modify the final cell shapes and/or cell wall thickness distributions in that product. Both are accomplished without any loss of channel integrity, because flow paths do not cross.

Two exceptions to channel integrity should be noted; these are transient structures which can be present at certain times or locations in the reforming process. The first transient is that resulting from a stagnant zone in a poor die design. The second is simply the result of the initial filling of the reduction die, which can cause the initial segment of the extrudate to have fewer channels than the steady-state extrudate.

It is a particular advantage of the invention that such reshaping procedures can result in a true "functional grading" of the reformed honeycomb shape. Thus a tapered (or reduced) honeycomb having a channel wall thickness which is below the wall thickness of the original honeycomb and which is in variable proportion to the extent of the reduction in channel cross-section is obtained.

FIG. 1 of the drawing provides a schematic elevational cross-section of a tapered honeycomb illustrating such a proportional reduction in wall thickness with channel cross-section. The part is much enlarged and the cell density therefore quite low in order to more clearly show the decrease in wall thickness with cell size which is characteristic of tapered honeycombs provided according to the invention.

In theory, using a filler ideally matched in plastic behavior to the honeycomb, the reduced honeycomb will have a ratio of channel wall thickness to channel diameter which corresponds very closely to the starting structure, and which remains substantially constant along the entire path from the inlet to the outlet of any tapered structure. This steady-state relationship can be expressed arithmetically in terms of channel wall thickness WT and cell density CD for any symmetrically tapered or reduced shape, as follows;

$$\left(\frac{CD_{reduced}}{CD_{initial}}\right) = \left(\frac{WT_{initial}}{WT_{reduced}}\right)^2 \quad (1)$$

wherein CD is cell density (channels/unit area) and WT is the thickness of the channel walls. The "reduced" CD and WT values are values determined at any point along the length of the tapered structure, since this relationship holds along that entire length.

In practice, the ratio of wall thickness to channel dimensions measured at points of reduction is typically found to vary somewhat from the theoretical value. In addition to being somewhat dependent on the relative compressibilities of the honeycomb material and filler at the reforming temperature and pressure, variations might also arise from factors such as the contraction of the filler upon solidification (see the density changes noted in Table I) and/or roughness and/or increased volume in the web. The latter effects may be introduced by a shortness in the web or filler or slight inhomogeneities (e.g. agglomerate and particle and wax crystal size distributions) in the web and/or the filler.

Heightened roughness in reduced channel walls appears to be common in honeycomb structures made from inhomogeneous material such as plasticized powder batches, with the level of roughening tending to be somewhat proportional to the magnitude of the reduction obtained and to size of the of the coarsest particles in the web and wax crystals in the fill. The roughness may also be due to the plastic deformation mechanism itself, i.e., it may be due to Luder slip lines.

Regardless of the mechanism, as the data shown below in Table II will demonstrate, web thickness does not decrease as rapidly as cell density in the course of reducing these honeycomb structures, and it is anticipated that, as channel diameters approach zero, a finite web thickness will remain. Nevertheless, the direction and magnitude of departures from theoretical reduction behavior can readily be determined by routine experiment. For example, in terms of equation (1) set forth above, a tapered product may be formed and the variation from ideal then determined as a correction factor C from the expression:

$$\left(\frac{CD_{reduced}}{CD_{initial}}\right) = C \cdot \left(\frac{WT_{initial}}{WT_{reduced}}\right)^2 \quad (2)$$

The correction factor thus calculated may then be used to predict wall thicknesses based on cell density changes for a localized range of reduction values close to the value at which the factor is calculated. In this way, the geometric parameters of a tapered or reduced honeycomb structure can be approximated through a definition of the starting materials and the geometry of the reforming die. Values for C in the range from about 1–4 may be routinely encountered, although it is expected that values close to the theoretical value of one can be achieved through proper matching of filler characteristics with the plasticized honeycomb materials being reformed, and through the use of smaller powder particle and wax crystallite sizes.

Further control over the relative extent of the reductions in cell size and channel wall thickness can be achieved through the use of filler materials with special reforming characteristics. For example, the cell width/wall thickness ratio can be decreased if the back-fill contains a contracting phase (i.e. collapsible hollow microspheres or liquids that form higher density crystals) which imparts high compressibility. Alternatively, additives which might effect an expansion of the filler during processing, such as the addition of a propellant (i.e. propane) or other expanding phase (i.e. ice), could be used to increase the cell width/wall thickness fraction, if desired.

Following reshaping of the filled honeycomb in the manner above described, the filler will be removed from the channel structure as appropriate and the honeycomb treated to solidify the reformed shape. Filler removal may be carried out through the use of solvents or other chemical means if desired. However, for most heat-softenable fillers removal is best effected by the application of a mild heat treatment to melt, liquefy and gravity drain and/or blow and/or blot the filler from the reformed structure.

Solidification treatments following filler removal will normally involve the same chemical and/or thermal processing as prescribed for solidification of the original plasticized powder composition. For plasticized ceramic or metal powder formulations, solidification typically requires drying and relatively high temperature firing to sinter or reaction-sinter the component powders into the desired consolidated material. Residual filler material present in the channel structure in these cases will ordinarily be completely removed by volatilization and/or oxidation in the course of the process. Obviously, more attention will be paid to the presence and/or behavior of residual filler in the case of very high cell density parts, since capillary effects complicate filler removal as the channels become finer and longer.

The following example will more fully illustrate a typical procedure for the production of a tapered honeycomb structure in accordance with the invention.

EXAMPLE

A plasticized powder batch is compounded to include 45 parts by weight of kaolin clay, 41 parts by weight of talc, and 14 parts by weight of alumina. These are dry blended in a Littleford mixer with 4 parts methyl cellulose binder and 1 part lubricant, and then mulled in a Porto-muller while adding 32.5 parts of de-ionized water.

The batch is further plasticized and consolidated to remove any air inclusions by evacuation and subsequent extrusion through a screen pack and spaghetti die. Thereafter it is extruded through a honeycomb extrusion die to provide a cylindrical honeycomb structure about 4.47 inches in diameter and 15 inches in length. As extruded, this wet-green honeycomb includes about 350 square channels per square inch of cross-sectional area, with the channels being separated from one another by channel walls approximately 0.008 inches in thickness.

While the honeycomb is still in a wet, plastic state it is preheated/gelled to 90° C. in air at 100% relative humidity and the honeycomb channels are filled with a liquefied microcrystalline wax, in this case Bareco Ultraflex wax, commercially available from Bareco Products of Rock Hill, S.C. The wax is liquefied by heating to a temperature of 90° C. to adjust its fluidity. The honeycomb is immersed in an excess of this wax, both to prevent water loss from honeycomb surfaces and to provide a reservoir from which wax may be drawn into the cellular structure as wax shrinkage occurs during solidification.

The filled honeycomb is allowed to cool overnight to room temperature (20° C.) for reshaping. It is then placed in the barrel of a ram extruder, the barrel being about 4.50 inches in diameter and slightly larger than the honeycomb so as to provide a slip-fit. Attached to the outlet of this extruder is a conventional reduction die incorporating a die cavity of conical frustum shape, comprising a circular inlet 4.49 inches in diameter which smoothly tapers down to a circular outlet about 2.25 inches in diameter.

Low ram pressure (on the order of 600 psi) is applied to the filled honeycomb, forcing it into and partially through the reduction die. The relative plasticities of the honeycomb and filler at this extrusion temperature (20° C.) are sufficiently well-matched that all elements of the combination, including the channels, channel walls, and filler, are reduced in size by the die in approximate proportion to the reduction in diameter of the honeycomb. No core seepage of the filler from the filled cells is observed during this reforming process. The channel backfill and the web extrude at the same volume rate (cc/s) ratio as their volume (cc) ratio.

Figure 4:
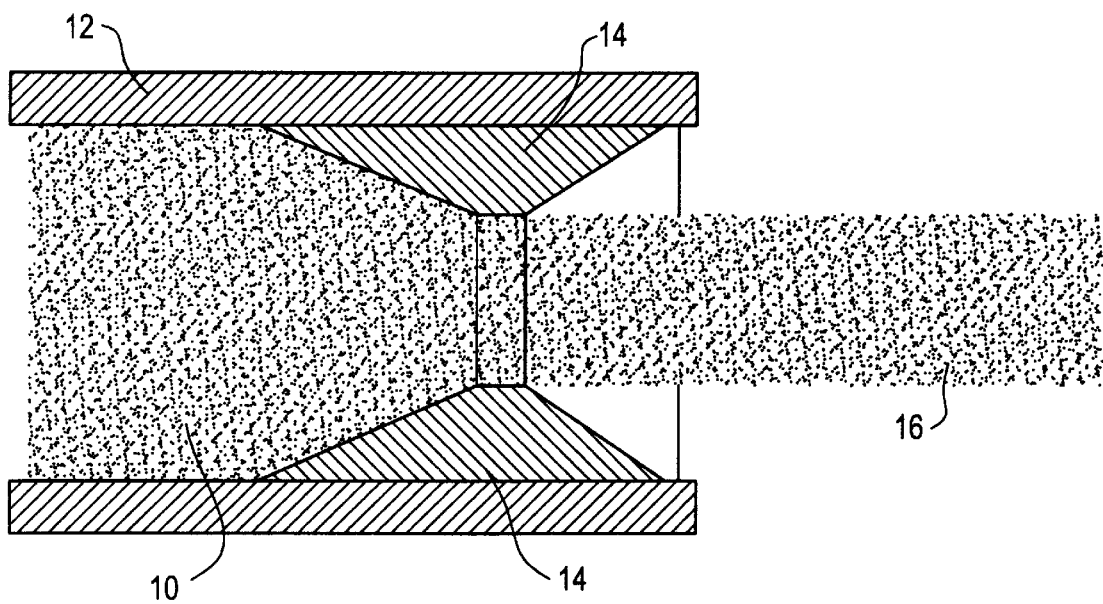
FIG. 4 is a schematic illustration in cross-section of reduction extrusion apparatus useful in the practice of the invention.

A schematic illustration of this procedure and apparatus for practicing it is presented in FIG. 4 of the drawing, FIG. 4 shows filled honeycomb billet 10 positioned in an extruder barrel 12 for reduction extrusion through die 14, in the process of which billet 10 is reduced in diameter to produce filled honeycomb extrudate 16.

Following extrusion, the reforming equipment is disassembled and the tapered segment of filled honeycomb extrudate remaining in the die, referred to as the transition zone, is carefully extracted therefrom as a conically tapering honeycomb element. The filler is then removed from the channels of the tapered honeycomb by heating and draining the wax at 100% relative humidity. Finally, the tapered honeycomb is dried and fired to burn out residual wax and convert the green tapered part to a fully reacted and consolidated polycrystalline cordierite honeycomb funnel.

Careful examination of the tapered honeycomb product of this reshaping procedure confirms that good proportionality in size reduction has been achieved over the entire range of cell sizes and cell wall thicknesses produced. The fired part exhibits smooth taper from its initial cell density of 420 cells/in2 and wall thickness of 0.007 inches to a reduced cell density of 1700 cells/in2 and wall thickness of 0.0042 inches. While the thickness of the reduced cell wall is somewhat higher than would be dictated by theory (0.0035 inches), this result can probably be accounted for by the texturing of the wall surface which is observed in the processed part.

Results similar to those of the above Example can be replicated over a very wide range of initial and final honeycomb shapes and sizes. Table II below sets forth data on a number of tapered honeycombs (funnels) produced as hereinabove described. Reported in that Table for each of the tapered honeycomb parts recorded are the funnel entrance diameter $OD_i$ (in inches), cell density $CD_i$ (in cells/in²±5%), and channel wall thickness $WT_i$ (in thousandths of an inch ±10%), as well as the reduced or funnel exit diameter $OD_r$, cell density $CD_r$, and channel wall thickness $WT_r$. $OD_r$ values coded "h" indicate that the cross-section of the reduced extrudate is hexagonal in shape. Calculated values for the correction factor C as determined from equation (2) above are given to within ±20%. These latter values illustrate the extent to which the decreases in web thickness lag the increases in cell density as the degree of reduction of these structures becomes larger.

TABLE II

Tapered Honeycomb Bodies

| Part No. | Entrance Dimensions (initial) | | | Exit Dimensions (reduced) | | | Correction Factor C ± 20% |
|---|---|---|---|---|---|---|---|
| | $OD_i$ [in] | $CD_i$ [csi] | $WT_i$ [mils] | $OD_r$ [in] | $CD_r$ [csi] | $WT_r$ [mils] | |
| 1 | 4.0 | 24 | 39 | 2.0 | 110 | 18 | 1.0 |
| 2 | 4.1 | 220 | 12 | 2.1 | 930 | 6.5 | 1.3 |
| 3 | 4.1 | 210 | 11 | 2.1 | 820 | 6.3 | 1.4 |
| 4 | 2.3 | 890 | 6.4 | 0.3 h | 32000 | 1.4 | 1.8 |
| 5 | 2.3 | 820 | 6.6 | 0.4 h | 24000 | 2.3 | 3.6 |
| 6 | 4.1 | 410 | 11 | 3.0 | 790 | 9.5 | 1.4 |
| 7 | 4.1 | 420 | 6.8 | 2.1 | 1700 | 4.2 | 1.5 |
| 8 | 2.2 | 1600 | 4.4 | 0.9 | 7700 | 2.3 | 1.3 |
| 9 | 2.5 | 310 | 7.8 | 1.0 | 2500 | 3.7 | 1.7 |
| 10 | 2.5 | 370 | 7.2 | 1.0 | 2600 | 3.0 | 1.2 |
| 11 | 2.4 | 370 | 6.1 | 1.2 | 1500 | 3.4 | 1.3 |
| 12 | 2.5 | 600 | 4.8 | 1.0 | 4300 | 2.7 | 2.2 |

Figure 2:
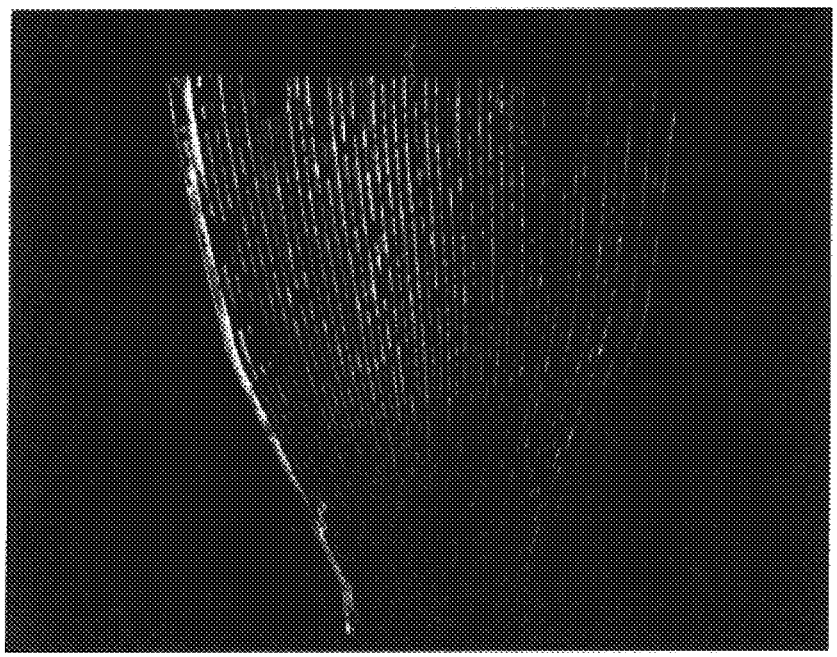
FIG. 2 is a photograph of a rough-cut cross-section of a tapered honeycomb element provided in accordance with the invention.

FIG. 2 of the drawing is a photograph of a cross-section of the tapered honeycomb body produced in a manner similar to that described in the foregoing Example and Table II. Corresponding to Example 9 from Table II above, the tapered honeycomb body shown in cross-section in FIG. 2 has 2.5 inch entrance diameter, at a cell density of 310 cells per square inch and with a wall thickness of 0.0078 inches. The exit diameter of the part is 0.97 inches and has a cell density of 2500 cells per square with a wall thickness of about 0.0037 inches.

Procedures similar to those of the Example above may be used to produce high-cell-density honeycomb bodies of cylindrical or other straight or flat shape, as well as funnel shapes offering very high cell density at the more reduced end. Table III below reports additional data for various reduced honeycomb structures, including the funnels reported in Table II above and additional funnel, straight or flat honeycomb parts resulting from reduction processing in accordance with the invention. Included are data for products produced by a single-stage reduction procedure, as well as products produced by two-stage reductions and three stage reductions. In the two- and three-stage reduction procedures the previously reduced products are bundled and re-extruded to achieve further reductions in cell size and channel wall dimensions.

For each of the honeycombs reported in Table III, values for the outer diameter (OD), cell density (CD), and channel wall thickness (WT) of each part or part section are shown. These are reported in inches, cells per square inch, and thousandths of an inch, respectively. Again, OD values coded "h" indicate that the reformed part is of hexagonal cross-section; an "hb" code indicates the part measured was a component of a larger bundle.

Honeycomb parts referenced in Table II are identified by the same part numbers in Table III. Where two sets of values are given for a single part number, the part is a tapered honeycomb and the values are taken from opposite ends of the tapered shape. The number of reduction stages used to produce each part is also noted; where the number of stages is zero the dimensions given are those for the part as positioned in the extruder barrel prior to reduction processing.

The reformed honeycombs in Table III are grouped according to the nominal geometry and/or composition of the starting honeycomb extrusion stock. In some cases the honeycomb stock is identified as "reconstituted". These are cases where the honeycombs have been dried after manufacture, and then re-plasticized by exposure to water prior to reforming in accordance with the invention. Variations between the stock dimensions and those of the actual parts before reforming arise as the parts are handled and sized for the extruder barrel prior to processing.

To more clearly illustrate the effect of reduction processing on the relationship between cell size and channel wall thickness, values for the cell pitch P and the ratio "c" of cell pitch to cell wall thickness (P:WT) are also reported in Table III. Cell pitch P corresponds to linear cell spacing and is the length occupied by one cell diameter plus one adjacent channel wall. Wall thickness and cell pitch values are reported in inches within ±5%, and "c" to within ±7%. A comparison of "c" with cell pitch P shows directly the manner in which the web becomes proportionately thicker as the extent of cell size reduction during extrusion processing increases.

TABLE III

Honeycomb Reductions

| Part No. | Reduction Stage | OD [in] | CD [csi] | WT [in] | Cell Pitch [in] | "c" |
|---|---|---|---|---|---|---|
| Stock: CD = 28 csi, WT = 36 mils (nominal) | | | | | | |
| 1 | 0 | 4.0 | 24 | .039 | .203 | 5.3 |
| 1 | 1 | 2.0 | 110 | .018 | .097 | 5.3 |
| Stock: CD = 200 csi, WT = 12 mils (nominal) | | | | | | |
| 2 | 0 | 4.1 | 220 | .012 | .068 | 5.7 |
| 3 | 0 | 4.1 | 210 | .011 | .069 | 6.6 |
| 2 | 1 | 2.1 | 930 | .0065 | .033 | 5.0 |
| 4 | 1 | 2.3 | 890 | .0064 | .034 | 5.3 |
| 5 | 1 | 2.3 | 820 | .0066 | .035 | 5.3 |
| 3 | 1 | 2.1 | 820 | .0063 | .035 | 5.5 |
| 12 | 2 | 0.9 | 3800 | .0039 | .016 | 4.2 |
| 13 | 2 | 0.9 | 4300 | .0037 | .015 | 4.1 |
| 5 | 2 | 0.4 h | 24000 | .0023 | .0065 | 2.8 |
| 4 | 2 | 0.3 h | 32000 | .0014 | .0056 | 4.0 |
| Stock: CD = 400 csi, WT = 12 mils (nominal) | | | | | | |
| 6 | 0 | 4.1 | 410 | .011 | .050 | 4.4 |
| 6 | 1 | 3.0 | 790 | .0095 | .036 | 3.7 |
| 14 | 1 | 2.1 | 1900 | .0064 | .023 | 3.6 |
| 15 | 2 | 0.9 | 9900 | .0033 | .010 | 3.0 |
| Stock: CD = 400 csi, WT = 7 mils (nominal) | | | | | | |
| 7 | 0 | 4.1 | 420 | .0068 | .049 | 7.2 |
| 16 | 1 | 3.0 | 820 | .0060 | .035 | 5.8 |
| 8 | 1 | 2.2 | 1600 | .0044 | .025 | 5.7 |
| 7 | 1 | 2.1 | 1700 | .0042 | .024 | 5.8 |
| 17 | 2 | 0.9 | 6700 | .0025 | .012 | 5.0 |
| 8 | 2 | 0.9 | 7700 | .0023 | .011 | 5.0 |
| 18 | 2 | 0.3 h | 27000 | .0018 | .0061 | 3.4 |
| 19 | 3 | 0.2hb | 57000 | .0012 | .0042 | 3.5 |
| Stock: CD = 400 csi, WT = 7 mils (reconstituted) | | | | | | |
| 9 | 0 | 2.5 | 310 | .0078 | .057 | 7.1 |
| 10 | 0 | 2.5 | 370 | .0072 | .052 | 7.2 |
| 9 | 1 | 1.0 | 2500 | .0037 | .020 | 5.5 |
| 10 | 1 | 1.0 | 2600 | .0030 | .020 | 6.6 |
| Stock: CD = 400 csi, WT = 4 mils (reconstituted) | | | | | | |
| 11 | 0 | 2.4 | 370 | .0061 | .052 | 8.5 |
| 20 | 1 | 1.4 | 1100 | .0037 | .030 | 8.1 |
| 21 | 1 | 1.4 | 1100 | .0033 | .030 | 9.2 |
| 22 | 1 | 1.4 | 1200 | .0030 | .029 | 9.8 |
| 11 | 1 | 1.2 | 1500 | .0034 | .026 | 7.6 |
| 23 | 1 | 1.2 | 1500 | .0033 | .026 | 7.8 |
| 24 | 1 | 1.2 | 1500 | .0029 | .026 | 8.9 |
| 25 | 1 | 1.2 | 1500 | .0028 | .026 | 9.1 |
| 26 | 1 | 0.5 | 16000 | .0015 | .0078 | 5.2 |

TABLE III-continued

Honeycomb Reductions

| Part No. | Reduction Stage | OD [in] | CD [csi] | WT [in] | Cell Pitch [in] | "c" |
|---|---|---|---|---|---|---|
| Stock: CD = 600 csi, WT = 4 mils (reconstituted) | | | | | | |
| 12 | 0 | 2.5 | 600 | .0048 | .041 | 8.5 |
| 12 | 1 | 1.0 | 4300 | .0027 | .015 | 5.7 |

As indicated by the data in Table III, multiple sequential reforming steps involving the bundling and re-extrusion of previously reduced parts provides an effective method for further extending the reductions in cell dimensions, permitting very high cell densities with continuous reductions in wall thickness at each reduction stage. The only practical limit on channel size and cell wall thickness appears to be the particle sizes of the powders employed in formulating the batch and the wax microstructure crystal size.

Figure 3:
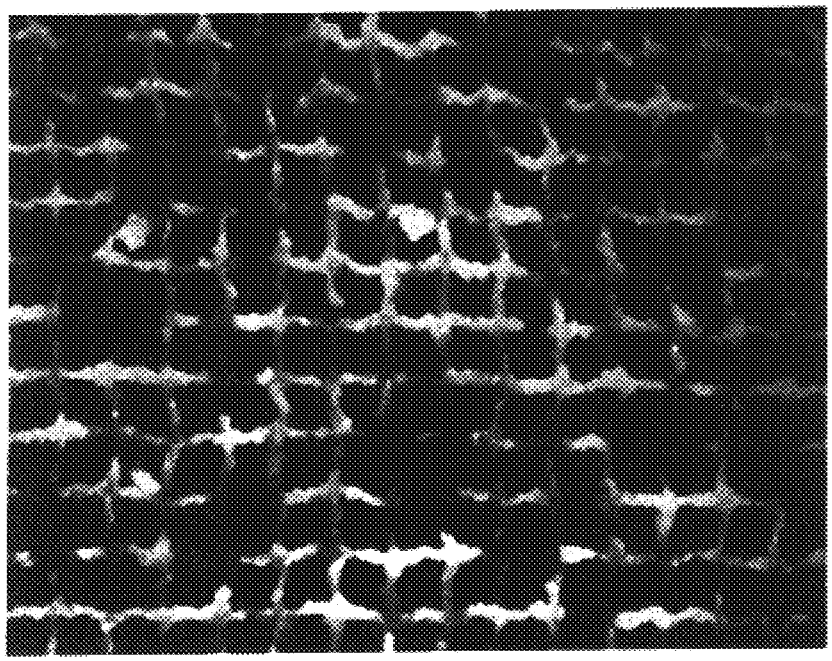
FIG. 3 is an optical photomicrograph of a high-cell-density honeycomb element formed by the method of the invention.

FIG. 3 is an optical photomicrograph of a high-cell-density honeycomb element formed by the method of the invention, corresponding to Part No. 18 from Table III. That part is a twice-reduced honeycomb structure having a cell density of 27000 cells per square inch with a wall thickness of 0.0018 inches.

The clear progression of cell density, wall thickness, cell pitch and the wall thickness ratio "c" with decreases in part diameter shown by the data in Table III helps to illustrate the flow/extrusion mechanism operative in invention. Because the flow paths of the processed materials do not cross during reforming, the component volumes remain constant and the number N of honeycomb "channels in" equals the number of "channels out". Thus the relationship:

$$N = \pi OD_{init}^2 CD_{init} = \pi OD_{red}^2 CD_{red}$$

is preserved.

Sequential filling and re-extrusion or reforming steps such as illustrated in Table III can be carried out using conventional bundling and molding procedures, with the precaution that the outer skin of any reformed components to be included in the bundle be kept as free of wax or other filler material as practicable. These procedures are particularly useful to produce large-diameter high-cell-density honeycombs.

Protection of the outer skin of the honeycomb from contact with the filler material can be achieved, for example, through the use of an RTV silicone block (e.g., Dow Corning DAP 8640, commercially available from Dow-Corning Corporation, Midland, Mich.). This is preferably applied together with an 0.001 inch thick aluminum foil backing to the outer skin of dry-green honeycomb shapes before the reconstitution step and before the initial back-filling step is carried out. The cured-silicone blocking layer can then be peeled away from the shape after the solidification of the fill and just prior to the initial reforming step, leaving the uncontaminated outer skin available for later bundling and effective knitting with other bundled honeycombs during a subsequent reduction step.

An alternative skin shielding strategy employs a hydrogel sheet of crosslinked (electron-beamed) PVP in place of the silicone blocking layer. This material peels away gently enough to be used even on very thin plasticized honeycomb skin layers, and it has the added benefit of immobilizing free water from condensation or improper reconstitution. A example of a suitable hydrogel is Procam EX00473, commercially available from Ludlow Corp of Chicopee, Mass.

While most primary applications for the invention involve axially extending and thereby reducing in size and weight the channel structure of a selected starting honeycomb, other applications for the reforming process will also be apparent. For example, honeycomb cross-flow structures comprising channels oriented transverse to as well as parallel with the direction of elongation or extrusion can be reformed in this manner. In these cases reduction processing imparts curved flowpaths to the transverse channels as the dimensions of the axial channels and cell walls are being reduced. These curved channel paths could be straightened by a second stage reduction in the opposite direction, if desired. Cross-flow structures of these designs may offer unique advantages by offering new and complex flowpaths for interactions between cross-flowing fluid streams.

Yet another reformed honeycomb structure provided in accordance with the invention is a curved honeycomb body wherein all of the longitudinal channels are curved about a common axis of curvature. Structures of this type offer the characteristic that channels having higher radii of curvature (closer to the outer edge of the curve) have smaller channel cross-sections and thinner channel walls than channels having lower radii of curvature. Further, the ratio of channel cross-section to channel wall thickness is substantially invariant for all channels within the curved structure. The flow might be made uniform across this elbow by changing the cross-section of substrate along the curve so as to have the same pressure drop for each channel through the curved honeycomb.

Thus it can be seen that the methods of the invention enable the production of very high cell density products, including fine cylindrical honeycombs of both high and low channel aspect ratio as well as tapered structures of functionally graded shape. Large flat, planar microchannel arrays can easily be assembled from segments of the highly reduced honeycomb cross-sections thereby produced, or such segments may be laminated to lower cell density honeycombs or other flow-controlling structures as desired.

We claim:

1. A cellular honeycomb body comprising a plurality of longitudinal channels separated from each other by channel walls traversing the body from a first body end face to a second body end face, wherein at least some of the channels comprise a length portion (i) having a channel cross-section which decreases in at least one cross-sectional dimension over the length portion, and (ii) adjoining channel wall segments which decrease in thickness over the length portion.

2. A cellular honeycomb body in accordance with claim 1 wherein the cross-sectional dimension of the plurality of channels decreases continuously to impart taper to the length portion of the body in that dimension.

3. A cellular honeycomb body in accordance with claim 2 wherein the cross-sections of the plurality of channels decrease continuously in two cross-sectional dimensions, thereby imparting two-dimensional taper to the length portion of the body.

4. A cellular honeycomb body in accordance with claim 3 wherein the decrease in the cross-sections of the plurality of channels is symmetric in two dimensions, thereby imparting symmetrical taper to the length portion.

5. A cellular honeycomb body in accordance with claim 4 having a circular cross-section in planes orthogonal to the axes of the channels and wherein the length portion is conically tapered.

6. A cellular honeycomb body in accordance with claim 5 which exhibits conical taper over its entire length.

7. A cellular honeycomb body in accordance with claim 6 which has the shape of a section of a right circular cone.

8. A cellular honeycomb body in accordance with claim 7 having an initial cell density CD initial and an initial channel wall thickness WT initial at the first body end face, and a reduced cell density CD reduced and a reduced channel wall thickness WT reduced at the second end face, which satisfy the relationship:

$$\left(\frac{CD_{reduced}}{CD_{initial}}\right) = C \cdot \left(\frac{WT_{initial}}{WT_{reduced}}\right)^2$$

wherein the factor C ranges from about 1 to 4.

9. A cellular honeycomb body comprising a plurality of longitudinal channels separated from each other by channel walls traversing the body from a first body end face to a second body end face, all of the longitudinal channels being curved about a common axis of curvature, wherein (i) channels having higher radii of curvature have smaller channel cross-sections and thinner channel walls than channels having lower radii of curvature, and (ii) the ratio of each channel cross-section to the thickness of its adjoining channel wall is substantially invariant throughout the body.

10. A cellular honeycomb body comprising a plurality of parallel open-ended longitudinal channels separated from each other by sintered ceramic channel walls traversing the body from a first body end face to a second body end face, having a cell density in excess of 1600 cells/in2 and a cell wall thickness below 0.004 inches.

11. A method of producing a cellular structure which comprises the steps of:
   selecting a honeycomb body formed of a plasticized powder batch material, the body having a cellular structure which includes a plurality of parallel channels having predetermined cross-sections;
   filling the channels with a filler material having a plastic deformation behavior compatible with that of the plasticized powder batch material in a selected temperature range, thus to form a filled composite;
   reshaping at least a portion of the filled composite while at a temperature in the selected temperature range to reduce the cross-sections of a plurality of the channels in at least one cross-sectional dimension; and
   removing the plastic filler from the channels.

12. A method in accordance with claim 11 wherein the powder batch material comprises powders selected from the group consisting of metallic, semi-metallic, ceramic and polymer powders.

13. A method in accordance with claim 11 wherein the powder batch material is a powdered amorphous, crystalline or semi-crystalline ceramic material selected from the group consisting of silicate, borate or aluminate glasses and crystalline or semicrystalline silicates, aluminates, borates, carbides, borides, and aluminides.

14. A method in accordance with claim 11 wherein the powder batch material comprises a mineral or refined powder selected from the group consisting of cordierite, spinel, clay talc, alumina, silica, and the oxides of calcium, magnesium, boron, titanium, germanium, and the alkali and transition metals.

15. A method in accordance with claim 11 wherein the plasticized batch material includes an aqueous plasticizing binder system comprising a water vehicle and a plasticizing cellulosic binder.

16. A method in accordance with claim 11 wherein the honeycomb body selected for treatment is a reconstituted honeycomb body produced by the steps of:
   selecting a dry-green honeycomb body formed of a powder batch material comprising a thermally gellable water-soluble binder; and
   saturating the dry-green body with water while at a temperature above the gel point of the thermally gellable binder.

17. A method in accordance with claim 11 wherein the filler is introduced into the honeycomb channel structure in liquid or dispersed form and is thereafter partly or completely solidified to a plastic state.

18. A method in accordance with claim 19 wherein the filler is a hydrophobic material selected from the group consisting of heat softenable vegetable and animal fats, natural and synthesized fatty acids, polyalcohols and esters, paraffins, natural and synthetic hydrocarbon waxes, synthesized thermoplastic polymers.

19. A method in accordance with claim 11 wherein the filled composite is reshaped by a compressive reforming procedure selected from the group consisting of molding and extrusion.

20. A method in accordance with claim 11 wherein the filled composite is reformed into a tapering form of prismatic or conical shape.

21. A method in accordance with claim 11 wherein the steps of filling and shaping the honeycomb body are repeated to further reduce the cross-sections of the plurality of the channels in at least one cross-sectional dimension thereof.

22. A method in accordance with claim 21 wherein, prior to at least the first step of filling, a protective skin layer is applied to the exterior surface of the plasticized powder honeycomb body to prevent the deposition of plastic filler material on the exterior surface.

23. A method in accordance with claim 21 wherein the shaping is carried out on a bundle of honeycomb bodies.

* * * * *